United States Patent
Bengani et al.

(10) Patent No.: US 11,240,228 B2
(45) Date of Patent: Feb. 1, 2022

(54) DATA SECURITY UTILIZING HISTORICAL PASSWORD DATA

(71) Applicant: International Business Machines Corporation, Armonk, NY (US)

(72) Inventors: Ruchika Bengani, Pearland, TX (US); Shikhar Kwatra, Durham, NC (US); Zachary A. Silverstein, Jacksonville, FL (US); Craig M. Trim, Ventura, CA (US); Michael Seth Silverstein, Jacksonville, FL (US)

(73) Assignee: International Business Machines Corporation, Armonk, NY (US)

( * ) Notice: Subject to any disclaimer, the term of this patent is extended or adjusted under 35 U.S.C. 154(b) by 185 days.

(21) Appl. No.: 16/686,306

(22) Filed: Nov. 18, 2019

(65) Prior Publication Data

US 2021/0152537 A1    May 20, 2021

(51) Int. Cl.
*H04L 29/06*        (2006.01)
*H04L 9/06*         (2006.01)
*G06F 21/33*        (2013.01)

(52) U.S. Cl.
CPC ............ *H04L 63/083* (2013.01); *G06F 21/33* (2013.01); *H04L 9/0637* (2013.01); *H04L 9/0643* (2013.01); *H04L 63/0428* (2013.01)

(58) Field of Classification Search
CPC ... H04L 63/083; H04L 63/0428; H04L 63/00; H04L 9/0637; H04L 9/0643; H04L 9/3239; H04L 9/3226; H04L 2209/38; G06F 21/33; G06F 21/316
USPC ...................................................... 713/168
See application file for complete search history.

(56) References Cited

U.S. PATENT DOCUMENTS

| 5,559,505 | A   |     | 9/1996  | McNair    |             |
|-----------|-----|-----|---------|-----------|-------------|
| 7,007,200 | B2  |     | 2/2006  | Salem     |             |
| 7,080,287 | B2  |     | 7/2006  | Salem     |             |
| 7,373,516 | B2  |     | 5/2008  | Ashok     |             |
| 8,667,305 | B2  | *   | 3/2014  | Schneider | H04L 9/3226 |
|           |     |     |         |           | 713/193     |
| 9,225,526 | B2  | *   | 12/2015 | Schneider | G06F 21/34  |
| 9,294,267 | B2  | *   | 3/2016  | Kamath    | H04L 9/0863 |

(Continued)

OTHER PUBLICATIONS

"A Secure Fault-Tolerant Method for Encrypted Password", IP.com No. IPCOM000248849D, IP.com Electronic Publication Date: Jan. 18, 2017, 5 pps.

(Continued)

*Primary Examiner* — Amare F Tabor
(74) *Attorney, Agent, or Firm* — William H. Hartwell; Daniel R. Simek (57) ABSTRACT

Aspects of the present invention disclose a method, computer program product, and system for performing a validation of authentication credentials from a user. The method includes one or more processors receiving authentication credentials input in an authentication session, the authentication credentials including a username and a password. The method further includes one or more processors generating a hash of the password of the received authentication credentials. In response to determining that the received authentication credentials are not valid, the method further includes one or more processors determining whether the generated hash of the password matches a stored hash associated with the username of the received authentication credentials.

14 Claims, 4 Drawing Sheets

(56) References Cited

U.S. PATENT DOCUMENTS

| | | |
|---|---|---|
| 9,871,797 B2 * | 1/2018 | Weinstein .............. H04L 63/101 |
| 9,876,783 B2 * | 1/2018 | Koved ...................... H04L 9/32 |
| 10,171,438 B2 | 1/2019 | Dinia et al. |
| 10,911,438 B2 * | 2/2021 | Jin ........................ H04L 9/3226 |
| 10,938,566 B2 * | 3/2021 | Finlow-Bates ....... H04L 9/0863 |
| 2014/0365780 A1 | 12/2014 | Movassaghi |
| 2018/0069843 A1 | 3/2018 | Alarifi et al. |
| 2019/0149540 A1 * | 5/2019 | Shimazu .............. H04W 12/69 726/4 |
| 2020/0213334 A1 * | 7/2020 | Kutner ............... H04L 63/1416 |

OTHER PUBLICATIONS

"Dynamic Number of Permitted Password Attempts", IP.com No. IPCOM000240066D IP.com Electronic Publication Date: Dec. 29, 2014, 6 pps.

"Method To Authenticate Users Based on Last Login Information", Original Publication Date: Oct. 16, 2008, IP.com No. IPCOM000175621D, 4 pps.

Bojinov, H.E Al., "Kamouflage: Loss-Resistant Password Management", 2017, 17 pps.

Chatterjee, R. et al., "Cracking-Resistant Password Vaults Using Natural Language Encoders", 2014, 21 pps.

Chatterjee, R. et al., "Password Typos and How to Correct Them Securely", 2015, 20 pps.

\* cited by examiner

```
# input variables
alpha = 0.1
input_dim = 7
hidden_dim = 16
output_dim = 100
# initialize neural network weights
synapse_0 = 2*np.random.random((input_dim,hidden_dim)) - 1
synapse_1 = 2*np.random.random((hidden_dim,output_dim)) - 1
synapse_h = 2*np.random.random((hidden_dim,hidden_dim)) - 1
# generate input and output
        x = np.array([x1,x2,x3,x4,x5,x6,x7])
        y = np.array([a[output_dim - position - 1]).T
        # hidden layer (input ~+ prev_hidden)
        layer_1 = sigmoid(np.dot(X,synapse_0) +
np.dot(layer_1_values[-1],synapse_h))

# output layer (new binary representation)
        layer_2 = sigmoid(np.dot(layer_1,synapse_1))
```

DATA SECURITY UTILIZING HISTORICAL PASSWORD DATA

BACKGROUND OF THE INVENTION

The present invention relates generally to the field of security, and more particularly to password authentication.

Information security is the practice of protecting information by mitigating information risks. Information security is a component of information risk management, typically involving preventing, or at least reducing. the probability of unauthorized/inappropriate access, use, disclosure, disruption, deletion/destruction, corruption, modification, inspection, recording or devaluation, of information. Additionally, information security can also involve reducing adverse impacts of incidents. Information may take any form, such as electronic or physical, tangible (e.g. paperwork), or intangible (e.g. knowledge).

An authentication protocol is a type of computer communications protocol or cryptographic protocol specifically designed for transfer of authentication data between two entities. Authentication protocols allow the receiving entity to authenticate the connecting entity (e.g. client connecting to a server) as well as authenticate to the connecting entity (e.g., server to a client) by declaring the type of information needed for authentication as well as syntax. Password Authentication Protocol is one of the oldest authentication protocols. Authentication is initialized by the client sending a packet with credentials (e.g., username and password) at the beginning of the connection, with the client repeating the authentication request until acknowledgement is received.

A hash function is any function that can be used to map data of arbitrary size to fixed-size values. The values returned by a hash function are called hash values, hash codes, digests, or simply hashes. The values are used to index a fixed-size table called a hash table. Use of a hash function to index a hash table is called hashing or scatter storage addressing. A cryptographic hash function (CHF) is a hash function that is suitable for use in cryptography. It is a mathematical algorithm that maps data of arbitrary size (often called the "message") to a bit string of a fixed size (i.e., the "hash value," "hash," or "message digest") and is a one-way function, that is, a function which is practically infeasible to invert. Cryptographic hash functions have many information-security applications, notably in digital signatures, message authentication codes (MACs), and other forms of authentication. Cryptographic hash functions can also be used as ordinary hash functions, to index data in hash tables, for fingerprinting, to detect duplicate data or uniquely identify files, and as checksums to detect accidental data corruption.

SUMMARY

Aspects of the present invention disclose a method, computer program product, and system for performing a validation of authentication credentials from a user. The method includes one or more processors receiving authentication credentials input in an authentication session, the authentication credentials including a username and a password. The method further includes one or more processors generating a hash of the password of the received authentication credentials. In response to determining that the received authentication credentials are not valid, the method further includes one or more processors determining whether the generated hash of the password matches a stored hash associated with the username of the received authentication credentials.

In an additional aspect of the present invention includes, in response to determining that the generated hash of the password does match a stored hash associated with the username, one or more processors presenting an authentication interface in the authentication session without incrementing a failed login count of the authentication session. Further, in response to determining that the generated hash of the password does not match a stored hash associated with the username, the method further includes one or more processors incrementing a failed login count of the authentication session.

DETAILED DESCRIPTION

Embodiments of the present invention allow for an authentication system that leverages historical credential information provided by a user. In response to receiving input of incorrect authentication credentials, embodiments of the present invention generate a hash of the credentials. Embodiments of the present invention can then compare the generated hash to a database of authorized has values to determine whether to increment a failed login count in the authentication session for the user. Additional aspects of the present invention maintain a database of hashes of incorrect authentication credentials that are followed by entry of correct authentication credentials.

Some embodiments of the present invention recognize that many times, when users log into a system that the user accesses infrequently, the user can repeat entry of incorrect passwords. Further, many authentication protocols and systems are programmed to lock a user out after a defined number of incorrect authentication attempts. Embodiments of the present invention can provide an improved authentication system that does not penalize users for repeatedly entering an incorrect password, based on stored hash values of historical common password entries by the user.

Further embodiments of the present invention can store hashed information (and other information) in a blockchain-enabled immutable ledger, where node transactions can include login attempts, typed password, keystroke mapping, geo-location, and temporal; metric information. In addition, embodiments of the present invention can store hashed information (and other information) in a long short-term memory (LSTM) data model taking into account a pattern history and respective metrics (e.g., a LSTM or a recurrent neural network (RNN)).

Implementation of embodiments of the invention may take a variety of forms, and exemplary implementation details are discussed subsequently with reference to the Figures.

Figure 1:
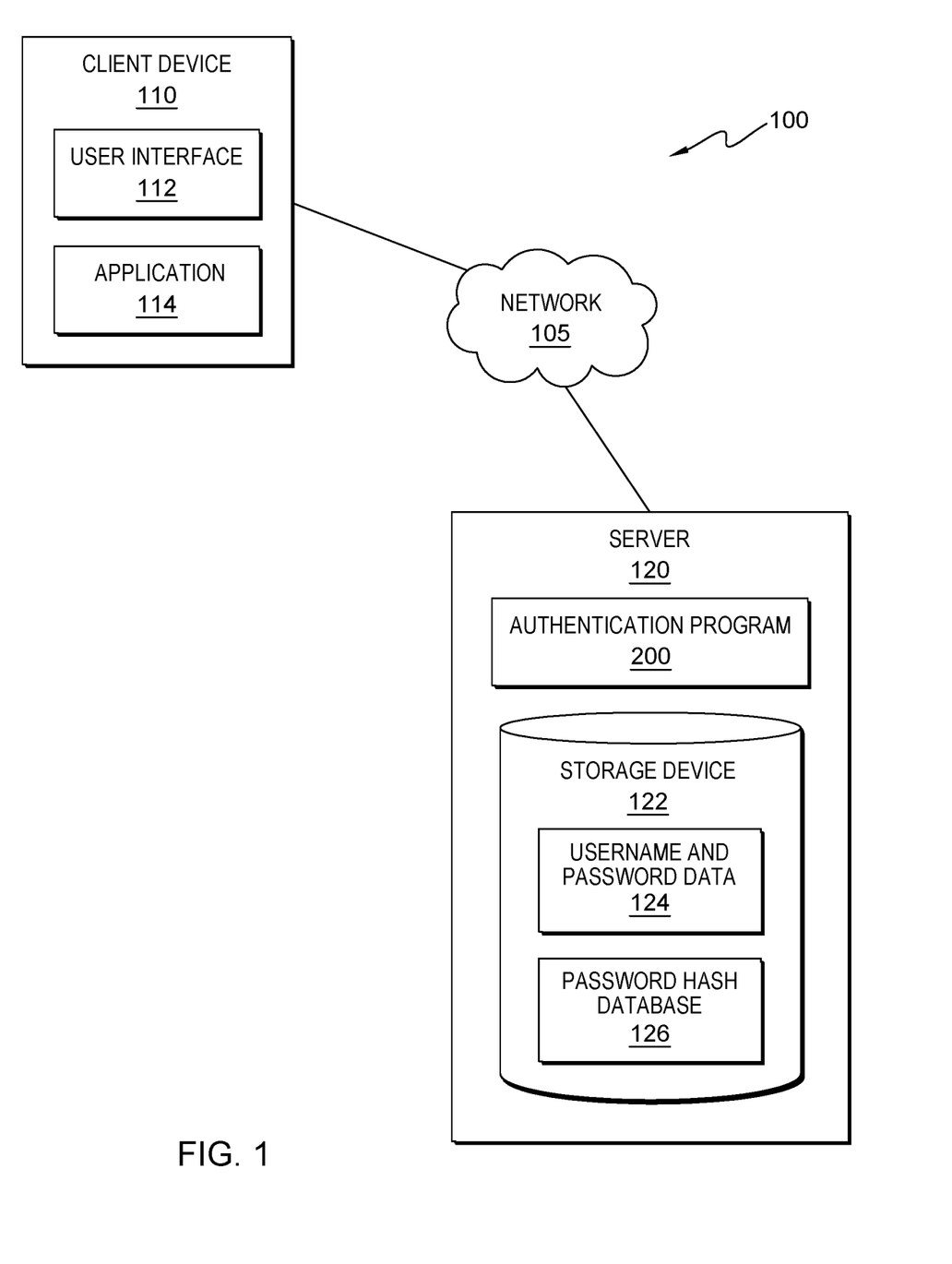
FIG. 1 is a functional block diagram of a data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

An embodiment of data processing environment 100 includes client device 110 and, and server 120, interconnected over network 105. In an example embodiment, server 130 provides information security and management services for an enterprise, such as user authentication. For example, a user of client device 110 provides authentication credentials, which server 120 (utilizing authentication program 200) validates, in accordance with embodiments of the present invention. In another example embodiment, data processing environment 100 utilizes server 120 to provide information security services to data hosted on the Internet, in accordance with embodiments of the present invention.

Network 105 can be, for example, a local area network (LAN), a telecommunications network, a wide area network (WAN), such as the Internet, or any combination of the three, and include wired, wireless, or fiber optic connections. In general, network 105 can be any combination of connections and protocols that will support communications between client device 110 and server 120, in accordance with embodiments of the present invention. In various embodiments, network 105 facilitates communication among a plurality of networked computing devices (e.g., client device 110 and server 120, corresponding users (e.g., an individual client device 110), and corresponding management services (e.g., server 120).

In various embodiments of the present invention, client device 110 may be a workstation, personal computer, personal digital assistant, mobile phone, or any other device capable of executing computer readable program instructions, in accordance with embodiments of the present invention. In general, client device 110 is representative of any electronic device or combination of electronic devices capable of executing computer readable program instructions. Client device 110 may include components as depicted and described in further detail with respect to FIG. 4, in accordance with embodiments of the present invention. In an example embodiment, computing device 110 is a smartphone. In another example embodiment, client device 110 is a personal computer or workstation.

Client device 110 includes user interface 112 and application 114. User interface 112 is a program that provides an interface between a user of client device 110 and a plurality of applications that reside on the computing device (e.g., application 114). A user interface, such as user interface 112, refers to the information (such as graphic, text, and sound) that a program presents to a user, and the control sequences the user employs to control the program. A variety of types of user interfaces exist. In one embodiment, user interface 112 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 112 is a script or application programming interface (API).

Application 114 can be representative of one or more applications (e.g., an application suite) that operate on client device 110. In an example embodiment, application 114 is a client-side application of a service or enterprise associated with server 130. In another example embodiment, application 114 is a web browser that an individual utilizing client device 110 utilizes (e.g., via user interface 112) to access and provide information over network 105. For example, a user of client device 110 provides input to user interface 112 of authentication credentials, which are transmitted to server 120 over network 105 (e.g., when logging into a service or application). In other aspects of the present invention, application 114 can be representative of applications that provide additional functionality (e.g., camera, messaging, etc.), in accordance with various aspects of the present invention.

In various embodiments of the present invention, the user of client device 110 registers with server 120 (e.g., via a corresponding application). For example, the user completes a registration process, provides information, and authorizes the collection and analysis (i.e., opts-in) of relevant data on at least client device 110, by server 120 (e.g., user profile information, user contact information, authentication information, user preferences, or types of information, for server 120 utilize with authentication program 200). In various embodiments, a user can opt-in or opt-out of certain categories of data collection. For example, the user can opt-in to provide all requested information, a subset of requested information, or no information.

In one example scenario, the user opts-in to provide a first category of information but opts-out of providing a second category of information, such as location-based information (on all or a subset of client device 110, or other devices associated with the user (not shown)). In further scenarios, the user of client device 110 creates a user profile that includes information (e.g., name, address, contact information, authentication credential data, identification data, etc.) that server 120, utilizing authentication program 200, utilizes to authenticate the user of client device 110 during a login operation. In another embodiment, a user of client device 110 can define which information that server 120 will store and utilize during and associated with an authentication process, in accordance with embodiments of the present invention.

In example embodiments, server 120 can be a desktop computer, a computer server, or any other computer systems, known in the art. In certain embodiments, server 120 represents computer systems utilizing clustered computers and components (e.g., database server computers, application server computers, etc.) that act as a single pool of seamless resources when accessed by elements of data processing environment 100 (e.g., client device 110). In general, server 120 is representative of any electronic device or combination of electronic devices capable of executing computer readable program instructions. Server 120 may include components as depicted and described in further detail with respect to FIG. 4, in accordance with embodiments of the present invention.

Server 120 includes authentication program 200 and storage device 122, which includes username and password data 124 and password hash database 134. In various embodiments, server 130 can be a management server that provides support (e.g., via authentication program 200) to an enterprise environment, in accordance with embodiments of the present invention. For example, server 120 utilizes authentication program 200 to in accordance with an authentication protocol to control access to one or more protected resources, accessible over network 105. In additional embodiments, server 120 includes capabilities to perform a hash function on received data, to generate a hash (e.g., hash value, digest, checksum, etc.) of the received data (e.g., authentication credentials), in accordance with various embodiments of the present invention.

In example embodiments, authentication program 200 performs a validation of authentication credentials from a user, in accordance with embodiments of the present invention. In various embodiments, authentication program 200 receives authentication credentials from a user and generates a hash of the received authentication credentials. Further, in response to determining that a validation of the authentication credentials has failed, authentication program 200 utilizes hashes of authentication credentials previously provided by the user to determine whether to increment a failed login count for the authentication session of the user, in accordance with embodiments of the present invention.

In example embodiments, server 120 utilizes storage device 122 to store information associated with user authentication activity (e.g., username and password data 124 and password hash database 126), user-provided information (e.g., user profile data, user preferences, encrypted user information, user data authorizations, etc.), and other data that authentication program 200 can utilize, in accordance with embodiments of the present invention. Storage device 122 can be implemented with any type of storage device, for example, persistent storage 405, which is capable of storing data that may be accessed and utilized by server 120, such as a database server, a hard disk drive, or a flash memory. In other embodiments, storage device 122 can represent multiple storage devices and collections of data within server 120.

In various embodiments, storage device 132 stored data provided by a user (e.g., of client device 110) during a registration process (e.g., the user registering with an application or service associated with server 120) that the user authorizes server 120 to gather and store. In additional embodiments, a user (i.e., a user of client device 110) can opt-in to have server 120 generate and store hashes of authentication data (e.g., in password hash database 126) for utilization with authentication program 200, in accordance with various embodiments of the present invention. In further embodiments, a user can access data associated with the user that is stored in storage device 122 (e.g., copy, share, delete, etc.) and define preferences for data stored in storage device 122 (e.g., stored for a defined length of time, etc.).

Username and password data 124 stores encrypted authentication credentials (e.g., usernames and corresponding passwords, etc.) for users corresponding to an entity (e.g., application, service, platform, etc.) that server 120 provides user authentication services. In an example embodiment, server 120 manages authentication of users logging into a banking application. In this example embodiment, username and password data 124 includes usernames and passwords for registered users of the banking application. Server 120 utilizes username and password data 124 to perform validation of user-provided authentication credentials (e.g., to an authentication interface), utilizing authentication program 200, in accordance with various embodiments of the present invention.

Password hash database 126 stores hashes (e.g., hash value, digest, checksum, etc.) of authentication credentials received by server 120, in accordance with embodiments of the present invention. In various embodiments, password hash database 126 stores hashes that are validated to correspond to an authorized user (e.g., adding to an authorized list of hashes). For example, server 120 stores hashes of incorrect password attempts that are followed by a successful validated login attempt. In additional embodiments, server 120 stores hashes passwords in password hash database 126 associated with a respective username (i.e., the username provided with the password in authentication credentials). Server 120 can generate hashes of received data and store the generated hashes in password hash database, associated with the user that provides the data, for use in processing of authentication program 200, in accordance with various embodiments of the present invention.

In an example embodiment, a user of client device 110 is attempting to log in to a banking application and enters authentication credentials. In this example embodiment, the user enters the correct username, but enters an incorrect password of "Cat" instead of the actual password of "Dog." Further, in a subsequent authentication attempt, the user enters the correct password, "Dog." Server 120 validates the authentication credentials (in reference to username and password data 124) and accordingly determines that the user is an authorized user. Server 120 also generates a hash of the previously provided incorrect password attempts in the authentication session by the verified user, such as generating a hash of "123abcd" for the "Cat" password attempt. In this example embodiment, server 120 stores the hash of "123abcd" for the "Cat" password attempt in password hash database 126. In additional embodiments, server 120 stores the hash of "123abcd" for the "Cat" password attempt in an authorized hash list of password hash database 126, to utilize in processing of authentication program 200, in accordance with various embodiments of the present invention.

In additional embodiments, storage device 122 (e.g., username and password data 124, password hash database 126, and other stored data) can store data in a blockchain enabled immutable ledger. In example embodiments, storage device 122 can store authentication information, such as login attempts, typed passwords, keystroke mapping, device data, authentication credentials, geolocation data, temporal metric information, etc., as node transaction in a blockchain enabled ledger.

Server 120 can also determine a device identifier (e.g., device type, indication of specific device, network location, etc.) of a device utilized in an authentication attempt. Then, server 120 can store the device identifier in storage device 122, associated with stored authentication information provided by the device (e.g., in password hash database 126, associated with a corresponding stored password hash, as a component of node information in a blockchain ledger, etc.). For example, each device associated with a particular user identifier can be considered as a participant in a blockchain network, even though the device belongs to the same user (e.g., branched nodes), due to the respective device having different corresponding hashes and authentication history. Accordingly, server 120, when executing authentication program 200 can perform a device-based similarity analysis, in accordance with carious embodiments of the present invention.

Figure 3:
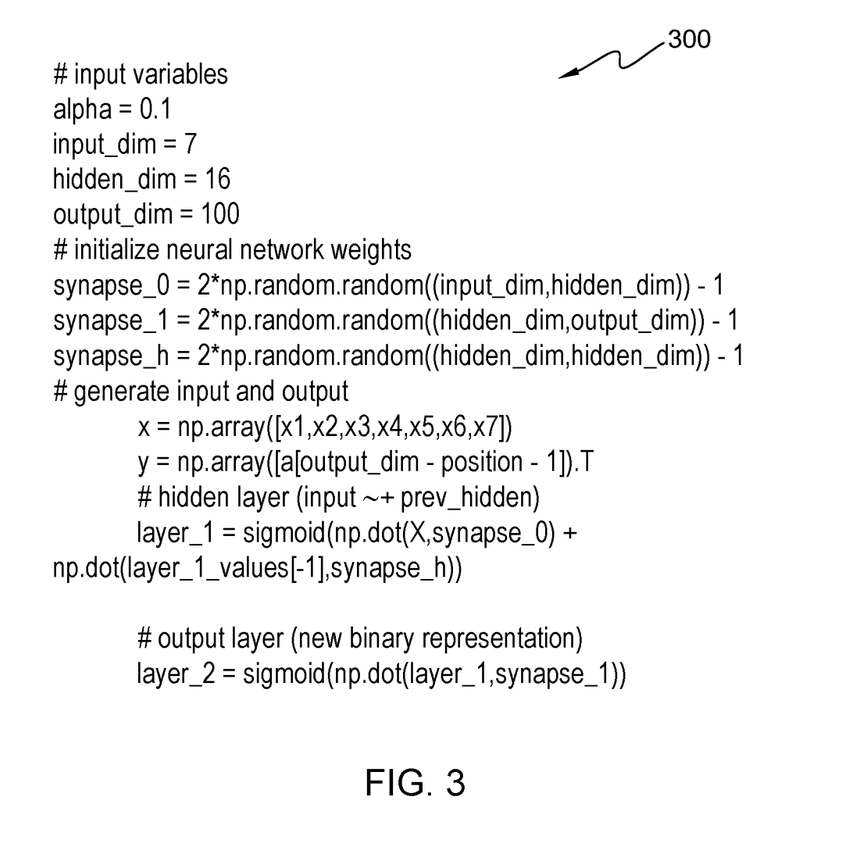
FIG. 3 is an example depiction of code to utilize to store information associated with authentication attempts, in accordance with embodiments of the present invention.

In another embodiment, server 120 stores hashed information in an LSTM data structure, such as an LSTM-RNN model that captures user information during authentication attempts. FIG. 3 depicts example code structure 300, which server 120 can utilize to store information associated with authentication attempts, in accordance with various embodiments of the present invention. As depicted in the example of FIG. 3, the variables "x1" corresponds to a number of login attempts, "x2" corresponds to a typed password, "x3" corresponds to a username, "x4" corresponds to keystroke mapping, "x5" corresponds to a geolocation metric, "x6" corresponds to a temporal metric, and "x7" corresponds to a utilized device. In the depicted embodiment of FIG. 3, selecting the current output error from the list computers the current error given the error at the hidden layer from the future and the error at the current output later to provide all counts that would relate to the user typing strokes on the keyboard and providing inputs relating to previous pattern history/past inputs. In additional embodiments, server 120 can utilize a blockchain enabled immutable ledger to store information depicted in FIG. 3 in a node, in accordance with an example embodiment of the present invention.

Figure 2:
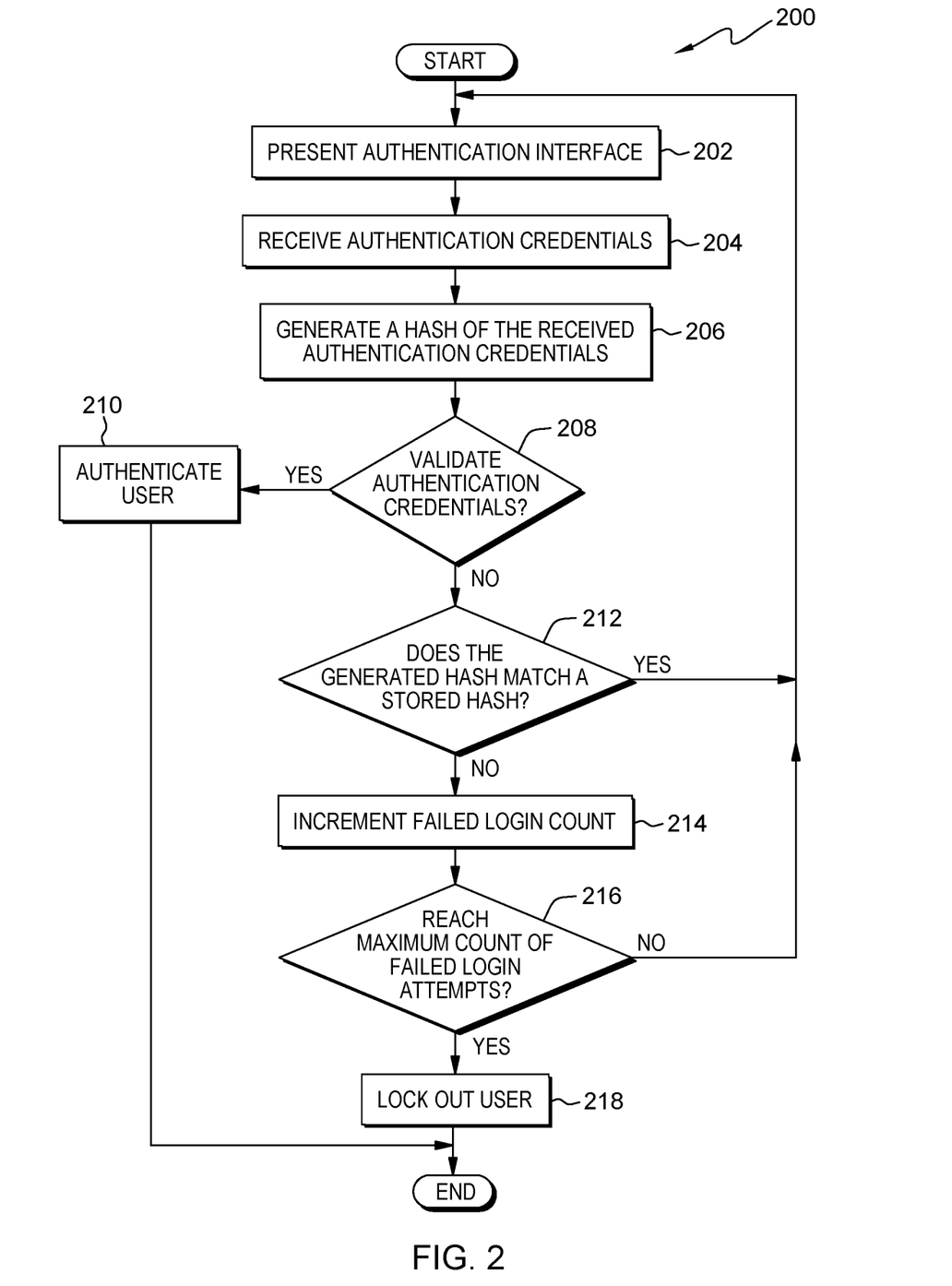
FIG. 2 is a flowchart depicting operational steps of a program for performing a validation of authentication credentials from a user, in accordance with embodiments of the present invention.

FIG. 2 is a flowchart depicting operational steps of authentication program 200, a program for performing a validation of authentication credentials from a user, in accordance with embodiments of the present invention. In one embodiment, authentication program 200 initiates in response to a user (e.g., a user of client device 110) attempting to access a protected resource or service. In example embodiments, authentication program 200 monitors for login/authentication attempts. For example, server 120 utilizes authentication program 200 to provide an authentication protocol service for an application or service (e.g., a banking application accessible via application 114).

In step 202, authentication program 200 presents an authentication interface. In one embodiment, in response to a user of client device 110 requesting to access an application or resource associated with server 120 (e.g., a protected resource), authentication program 200 presents an authentication interface to the user on client device 110 (e.g., via user interface 112 and application 114). For example, authentication program 200 presents an authentication interface (e.g., a login screen) that includes fields for the user to enter a username and a corresponding password (i.e., authentication credentials).

In other embodiments, authentication program 200 can generate and present any form of interface allowing a user to submit authentication credentials, in accordance with embodiments of the present invention. In an additional embodiment, authentication program 200 can allow a user to submit authentication credentials without generating and/or presenting an interface to the user on client device 110.

In step 204, authentication program 200 received authentication credentials. In one embodiment, authentication program 200 receives authentication credentials, including a password, from the user of client device 110 (e.g., in the presented authentication interface of step 202). For example, the user of client device 110 enters a username and password (e.g., into user interface 112 and/or application 114) and client device 110 transmits the username and password combination to server 120. In other embodiments, authentication program 200 can receive any form of authentication credential that server 120 can process and utilize in accordance with embodiments of the present invention.

In step 206, authentication program 200 generates a hash of the received authentication credentials. In one embodiment, authentication program 200 generates a hash of the received password of the authentication credentials (received in step 204). In additional embodiments, authentication program 200 can generate and store hashes for received usernames and received passwords (in password hash database 126) from received authentication credentials.

In various embodiments, server 120 includes capabilities to perform a hash function on received data, to generate a hash (e.g., hash value, digest, checksum, etc.) of the received data (e.g., authentication credentials), in accordance with various embodiments of the present invention. In example embodiments, authentication program 200 generates a unique hash for respective received passwords and stores the generated hash in password hash database 126, associated with a corresponding username (i.e., associated username and password combinations from entered authentication credentials).

In an example scenario, a user of client device 110 is attempting to log in to a banking application and enters authentication credentials. In this example scenario, the user of client device 110 (in step 204) enters authentication credentials that include a username of "Joe1993" and a password of "Cat." Authentication program 200 can then generate a hash corresponding to the entered password of the received authentication credentials. In this example scenario, authentication program 200 generates a hash of "123abcd" for the password of "Cat."

In decision step 208, authentication program 200 validates authentication credentials. In one embodiment, authentication program 200 determines whether the received authentication credentials (of step 204) match a set of authentication credentials in username and password data 124. For example, authentication program 200 determines whether the password entered in step 204 matches the password in username and password data 124, corresponding to the entered username. In the previously discussed example scenario, authentication program 200 determines whether, based on information in username and password data 124, the entered password of "Cat" matches the correct password for the username "Joe1993." In alternate embodiments, authentication program 200 perform the validation of received authentication credentials (in decision step 208) before, or concurrently with, generating a hash of received authentication credentials (in step 206), in accordance with various embodiments of the present invention.

In step 210, authentication program 200 authenticates the user. More specifically, in response to determining the received authentication credentials are valid (decision step 208, YES branch), authentication program 200 authenticates the user. In example embodiments, authentication program 200 authorizes the user to access the protected resource that corresponds to the validated authentication credentials (e.g., banking application, email, etc.). In additional embodiments, after authenticating the user and facilitating access to the resource requested by the user, authentication program 200 ends.

In decision step 212, authentication program 200 determines whether the generated hash matches a stored hash. More specifically, in response to determining that the received authentication credentials are not valid (decision step 208, NO branch), authentication program 200 determines whether the generated hash (of step 206) matches a hash stored in password hash database 126. In various embodiments, password hash database 126 stores hashes that are validated to correspond to an authorized user (e.g., adding to an authorized list of hashes). For example, server 120 stores hashes of incorrect password attempts that are followed by a successful validated login attempt. In additional embodiments, server 120 stores hashes passwords in password hash database 126 associated with a respective username (i.e., the username provided with the password in authentication credentials).

In the previously discussed example scenario, the user of client device 110 (in step 204) enters authentication credentials that include a username of "Joe1993" and a password of "Cat" and authentication program 200 generates (in step 206) a hash of "123abcd" for the password of "Cat." In this example scenario, authentication program 200 accesses password hash database 126 and identifies stored hash values that are associated with the "Joe1993" username (i.e., an authorized list of hashes corresponding to the username). Authentication program 200 can then determine whether the hash of "123abcd" (generated in step 206) matches a hash that is stored in password hash database 126 associated with the "Joe1993" username (i.e., in the authorized hash list).

In another embodiment, authentication program 200 can utilize computing device information (e.g., device type, device address, location, etc.) as a component of authentication credentials of a user, in accordance with various embodiments of the present invention. FIG. 3 depicts example code structure 300, which server 120 can utilize to store information associated with authentication attempts, in accordance with various embodiments of the present invention. As discussed previously, example code structure 300 includes variables the variables "x1" corresponds to a number of login attempts, "x2" corresponds to a typed password, "x3" corresponds to a username, "x4" corresponds to keystroke mapping, "x5" corresponds to a geolocation metric, "x6" corresponds to a temporal metric, and "x7" corresponds to a utilized device. In various embodiments, authentication program 200 can retrieve information from example code structure 300 (e.g., password hash, device information, etc.) in the process of determining whether the generated hash matches a stored hash (decision step 212).

In an example embodiment with regard to the previously discussed example scenario, authentication program 200 determines that the user of client device 110 (in step 204) enters authentication credentials that include a username of "Joe1993" and a password of "Cat" utilizing a smartphone (i.e., client device 110) with a corresponding device identifier of "1717333." In this example embodiment, authentication program 200 accesses password hash database 126 and identifies stored hash values that are associated with the "Joe1993" username and the device identifier of "1717333" (i.e., the authorized hash list). Authentication program 200 can then determine whether the hash of "123abcd" (generated in step 206) matches a hash of the authorized hash list in password hash database 126. In another example embodiment, authentication program 200 can identify an authorized hash list that includes hashes that are associated with the device identifier of "1717333."

In response to determining that the generated hash does match a stored hash (decision step 212, YES branch), authentication program 200 returns to present an authentication interface to the user (step 202) without incrementing a failed login count for the user. Embodiments of the present invention recognize that many authentication systems allow a maximum number of failed login attempts before locking out a user (e.g., for a defined period of time). Accordingly, in response to determining that the generated hash of a password (from a failed login attempt) matches a password hash in an authorized list of authorized hashes (for the user), authentication program 200 presents an authentication interface, without incrementing the login attempt count in relation to the maximum number.

In the previously discussed example scenario, authentication program 200 determines that the hash of "123abcd" (generated in step 206) does match a hash that is stored in password hash database 126 associated with the "Joe1993" username (i.e., the authorized hash list in password hash database 126 includes the hash of "123abcd"). In this example scenario, authentication program 200 presents an authentication interface to the user of client device 110, providing an indication that the previous login attempt has failed, without incrementing the failed login counter for the user in the authentication session.

In step 212, authentication program 200 increments the failed login count for the user. More specifically, in response to determining that the generated hash does not match a stored hash (decision step 121, NO branch), authentication program 200 increments a failed login count for the user in the authentication session (step 214). In one embodiment, authentication program 200 increments the existing filed login count for the user in the authentication session by one (i.e., from zero to one, from one to two, etc.).

In the previously discussed example scenario, authentication program 200 determines that the hash of "123abcd" (generated in step 206) does not match a hash that is stored in password hash database 126 associated with the "Joe1993" username (i.e., the authorized hash list in password hash database 126 does not include the hash of "123abcd"). In this example scenario, authentication program 200 increments the failed login count for the user of client device 110.

In decision step 216, authentication program 200 determines whether the maximum count of failed login attempts has been reached. In one embodiment, authentication program 200 compares the incremented failed login count (from step 214) to a defined maximum number of failed login attempts. In various embodiments, authentication program 200 can utilize any predefined number of failed login attempts as the defined maximum (e.g., defined by secure resource, such as an online banking platform), in accordance with embodiments of the present invention.

In response to determining that the maximum number of failed login attempts has not been reached (decision step 216, NO branch), authentication program 200 returns to present an authentication interface to the user (step 202). In various embodiments, authentication program 200 maintains the count of failed login attempts for users during an authentication session (e.g., for respective usernames for a defined period of time). In an example embodiment, authentication program 200 increments the failed login count for the user of client device 110 (in step 214) and presents an authentication interface to the user of client device 110, providing an indication that the previous login attempt has failed and an indication of the current failed login count (or indicating a number of login attempts remaining). Accordingly, in response to presenting the authentication interface, authentication program 200 waits for the user in the authentication session to enter another set of authentication credentials.

In step 218, authentication program 200 locks out the user. More specifically, in response to determining that the maximum number of failed login attempts has been reached (decision step 216, YES branch), authentication program 200 locks out the user. In an example embodiment, authentication program 200 locks out the user (e.g., based on username, device, etc.) from attempting to login and access the corresponding protected resource for a defined period of time (e.g., one hour, thirty minutes, or other defined parameter), in accordance with various embodiments of the present invention.

FIG. 3 depicts example code structure 300, which server 120 can utilize to store information associated with authentication attempts, in accordance with various embodiments of the present invention. As depicted in the example of FIG. 3, the variables "x1" corresponds to a number of login attempts, "x2" corresponds to a typed password, "x3" corresponds to a username, "x4" corresponds to keystroke mapping, "x5" corresponds to a geolocation metric, "x6" corresponds to a temporal metric, and "x7" corresponds to a utilized device. In the depicted embodiment of FIG. 3, selecting the current output error from the list computers the current error given the error at the hidden layer from the future and the error at the current output later to provide all counts that would relate to the user typing strokes on the keyboard and providing inputs relating to previous pattern history/past inputs. In additional embodiments, server 120 can utilize a blockchain enabled immutable ledger to store information depicted in FIG. 3 in a node, in accordance with an example embodiment of the present invention.

Figure 4:
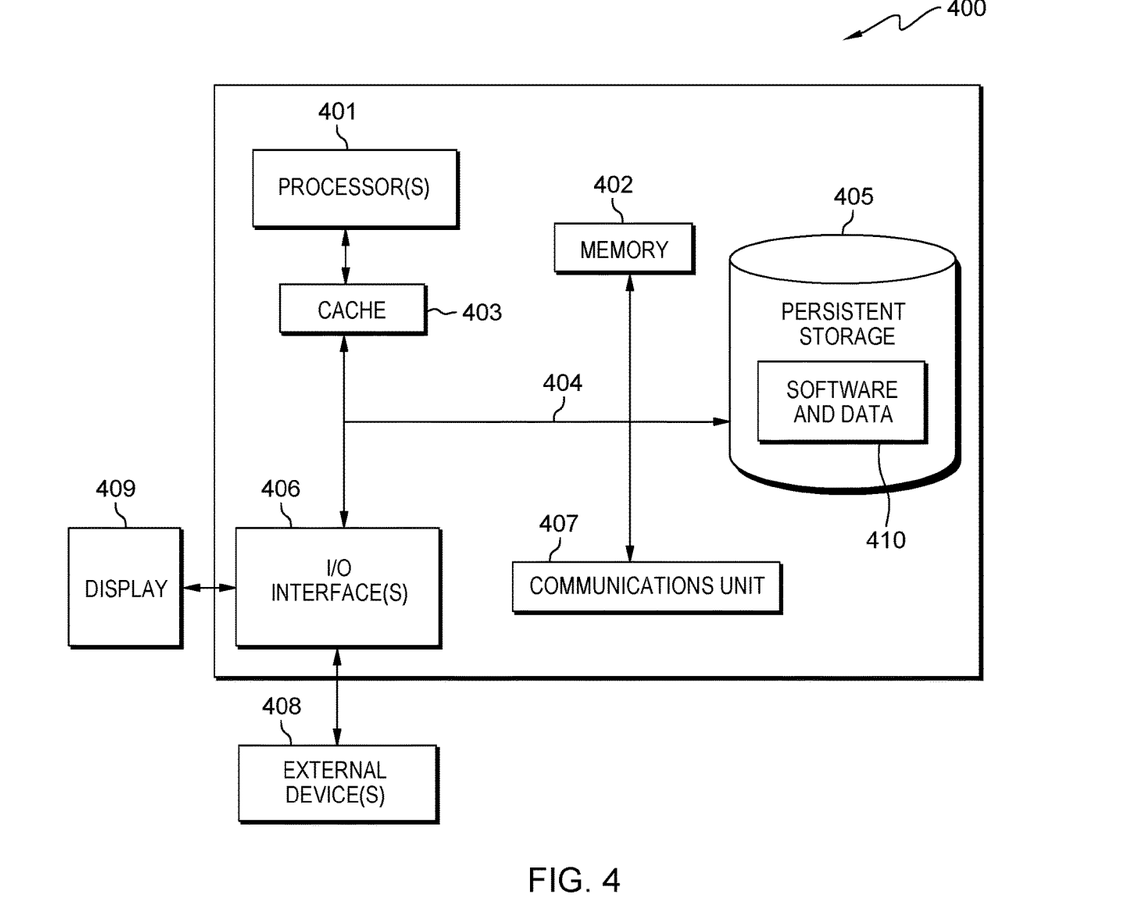
FIG. 4 depicts a block diagram of components of a computing system representative of the client device and server of FIG. 1, in accordance with an embodiment of the present invention.

FIG. 4 depicts computer system 400, which is representative of client device 110 and server 120, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made. Computer system 400 includes processor(s) 401, cache 403, memory 402, persistent storage 405, communications unit 407, input/output (I/O) interface(s) 406, and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processor(s) 401 by holding recently accessed data, and data near recently accessed data, from memory 402.

Program instructions and data (e.g., software and data 410) used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Software and data 410 can be stored in persistent storage 405 for access and/or execution by one or more of the respective processor(s) 401 via cache 403. With respect to client device 110, software and data 410 includes user interface 112 and application 114. With respect to server 120, software and data 410 includes authentication program 200, username and password data 124, and password hash database 126.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data (e.g., software and data 410) used to practice embodiments of the present invention may be downloaded to persistent storage 405 through communications unit 407.

I/O interface(s) 406 allows for input and output of data with other devices that may be connected to each computer system. For example, I/O interface(s) 406 may provide a connection to external device(s) 408, such as a keyboard, a keypad, a touch screen, and/or some other suitable input device. External device(s) 408 can also include portable computer readable storage media, such as, for example, thumb drives, portable optical or magnetic disks, and memory cards. Program instructions and data (e.g., software and data 410) used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   generating, by one or more processors, a list of authorized password hashes for a respective username by:
      identifying, by one or more processors, a first password included in a first failed login attempt of a first authentication session, wherein the first authentication session includes a successful login attempt subsequent to the first login attempt;
      generating, by one or more processors, a hash of the first password of the first failed login attempt; and
      adding, by one or more processors, the generated hash of the first password to the list of authorized password hashes;

receiving, by one or more processors, authentication credentials input in an authentication session, the authentication credentials including a username and a password;

generating, by one or more processors, a hash of the password of the received authentication credentials; and in response to determining that the received authentication credentials are not valid, determining, by one or more processors, whether the list of authorized password hashes includes the generated hash of the password associated with the username of the received authentication credentials.

2. The method of claim 1, further comprising:

in response to determining that the list of authorized password hashes includes the generated hash of the password associated with the username, presenting, by one or more processors, an authentication interface in the authentication session without incrementing a failed login count of the authentication session.

3. The method of claim 1, further comprising:

in response to determining that the list of authorized password hashes does not include the generated hash of the password associated with the username, incrementing, by one or more processors, a failed login count of the authentication session.

4. The method of claim 1, wherein the list of authorized password hashes is stored in a blockchain enabled immutable ledger.

5. The method of claim 1, wherein the list of authorized password hashes additionally indicates authorized password hashes corresponding to a computing device identifier.

6. A computer program product comprising:

one or more computer readable storage media and program instructions stored on the one or more computer readable storage media, the program instructions comprising:

program instructions to generate a list of authorized password hashes for a respective username by:
identifying a first password included in a first failed login attempt of a first authentication session, wherein the first authentication session includes a successful login attempt subsequent to the first login attempt;
generating a hash of the first password if the first failed login attempt; and
adding the generated hash of the first password to the list of authorized password hashes;

program instructions to receive authentication credentials input in an authentication session, the authentication credentials including a username and a password;

program instructions to generate a hash of the password of the received authentication credentials; and in response to determining that the received authentication credentials are not valid, program instructions to determine whether the list of authorized password hashes includes the generated hash of the password associated with the username of the received authentication credentials.

7. The computer program product of claim 6, further comprising program instructions, stored on the one or more computer readable storage media, to:

in response to determining that the list of authorized password hashes includes the generated hash of the password associated with the username, present an authentication interface in the authentication session without incrementing a failed login count of the authentication session.

8. The computer program product of claim 6, further comprising program instructions, stored on the one or more computer readable storage media, to:

in response to determining that the list of authorized password hashes does not include the generated hash of the password associated with the username, increment a failed login count of the authentication session.

9. The computer program product of claim 6, wherein the list of authorized password hashes is stored in a blockchain enabled immutable ledger.

10. A computer system comprising:

one or more computer processors;

one or more computer readable storage media; and program instructions stored on the computer readable storage media for execution by at least one of the one or more processors, the program instructions comprising:

program instructions to generate a list of authorized password hashes for a respective username by:
identifying a first password included in a first failed login attempt of a first authentication session, wherein the first authentication session includes a successful login attempt subsequent to the first login attempt;
generating a hash of the first password if the first failed login attempt; and
adding the generated hash of the first password to the list of authorized password hashes;

program instructions to receive authentication credentials input in an authentication session, the authentication credentials including a username and a password;

program instructions to generate a hash of the password of the received authentication credentials; and in response to determining that the received authentication credentials are not valid, program instructions to determine whether the list of authorized password hashes includes the generated hash of the password associated with the username of the received authentication credentials.

11. The computer system of claim 10, further comprising program instructions, stored on the computer readable storage media for execution by at least one of the one or more processors, to:

in response to determining that the list of authorized password hashes includes the generated hash of the password associated with the username, present an authentication interface in the authentication session without incrementing a failed login count of the authentication session.

12. The computer system of claim 10, further comprising program instructions, stored on the computer readable storage media for execution by at least one of the one or more processors, to:

in response to determining that the list of authorized password hashes does not include the generated hash of the password associated with the username, increment a failed login count of the authentication session.

13. The computer system of claim 10, wherein the generated list of authorized password hashes is stored in a blockchain enabled immutable ledger.

14. The computer system of claim 10, wherein the list of authorized password hashes additionally indicates authorized password hashes corresponding to a computing device identifier.

\* \* \* \* \*